United States Patent
LeClair et al.

(10) Patent No.: US 6,988,123 B2
(45) Date of Patent: Jan. 17, 2006

(54) METHODS AND APPARATUS FOR REMOTE EXECUTION OF AN APPLICATION OVER THE INTERNET

(75) Inventors: Gregory A. LeClair, San Jose, CA (US); Babulal J. Thummar, Milpitas, CA (US)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/329,182

(22) Filed: Jun. 10, 1999

(65) Prior Publication Data

US 2003/0055866 A1 Mar. 20, 2003

Related U.S. Application Data

(63) Continuation-in-part of application No. 09/187,193, filed on Nov. 6, 1998.

(51) Int. Cl.
*G06F 15/16* (2006.01)

(52) U.S. Cl. ............... 709/201; 709/207; 709/217; 709/221; 709/228; 709/245; 358/1.16; 358/1.17; 358/1.18; 358/400; 358/401; 358/402; 358/403; 358/404; 710/15

(58) Field of Classification Search ............... 709/201, 709/207, 217, 221, 228, 245; 358/1.16–1.18, 358/400, 401, 402, 403, 404, 1.15; 710/15; 315/200.3; 345/48; 357/1.16
See application file for complete search history.

(56) References Cited

U.S. PATENT DOCUMENTS

| | | |
|---|---|---|
| 5,276,879 A | 1/1994 | Barry et al. |
| 5,307,490 A | 4/1994 | Davidson et al. |

(Continued)

FOREIGN PATENT DOCUMENTS

| | | |
|---|---|---|
| EP | 0 854 415 | 7/1998 |
| EP | 0 872 792 | 10/1998 |
| EP | 0 886 206 | 12/1998 |
| JP | 5-292240 | 11/1993 |
| JP | 10-275063 | 10/1998 |
| WO | WO 99/18534 | 4/1999 |

OTHER PUBLICATIONS

R.M. Adler, "Distributed Coordination Models For Client/Server Computing", IEEE Computer Society, vol. 28, No. 4, Apr. 1, 1995, pp. 14–22, XP000507856.

Larry L. Peterson, "A Yellow–Pages Service For A Local–Area Network", Computer Communications Review, Association For Computing Machinery, vol. 17, No. 5, Aug. 1, 1988, pp. 235–242, XP–002061706.

(Continued)

*Primary Examiner*—Saleh Najjar
*Assistant Examiner*—Thu Ha Nguyen

(57) ABSTRACT

In a network having an input device, such as a scanner, camera, or fax, and a destination device, the input device initiates transmission of input data to a destination device. The input device sends a request to the destination device notifying it of input data that is ready to be transmitted. If the destination device wants to accept the request, when the destination device is ready, the destination device gets, or "pulls" the data from the input device over the network. The input device can request and receive status information from the destination device. The destination device can also request and receive status information from the input device.

36 Claims, 7 Drawing Sheets

U.S. PATENT DOCUMENTS

| | | | | |
|---|---|---|---|---|
| 5,513,126 | A | * | 4/1996 | Harkins et al. ............. 709/228 |
| 5,519,874 | A | * | 5/1996 | Yamagishi et al. ......... 709/201 |
| 5,535,222 | A | | 7/1996 | Le |
| 5,566,278 | A | | 10/1996 | Patel et al. |
| 5,666,486 | A | | 9/1997 | Alfieri et al. |
| 5,666,532 | A | | 9/1997 | Saks et al. |
| 5,687,320 | A | * | 11/1997 | Wiley et al. ................ 709/245 |
| 5,689,642 | A | * | 11/1997 | Harkins et al. ............. 709/207 |
| 5,701,451 | A | | 12/1997 | Rogers et al. |
| 5,822,507 | A | | 10/1998 | Uda et al. |
| 5,862,321 | A | * | 1/1999 | Lamming et al. ........... 709/200 |
| 5,933,580 | A | | 8/1999 | Uda et al. |
| 5,996,029 | A | * | 11/1999 | Sugiyama et al. ............ 710/15 |
| 6,144,997 | A | * | 11/2000 | Lamming et al. ........... 709/217 |
| 6,177,934 | B1 | * | 1/2001 | Sugiura et al. .............. 345/748 |
| 6,185,611 | B1 | * | 2/2001 | Waldo et al. ................ 709/221 |
| 6,219,151 | B1 | * | 4/2001 | Manglapus et al. ........ 358/1.15 |
| 6,249,794 | B1 | * | 6/2001 | Raman ........................ 715/500 |
| 6,256,662 | B1 | * | 7/2001 | Lo et al. ..................... 709/203 |
| 6,301,611 | B1 | * | 10/2001 | Matsumoto et al. ........ 709/217 |
| 6,421,069 | B1 | * | 7/2002 | Ludtke et al. ............... 345/762 |
| 6,437,875 | B1 | * | 8/2002 | Unno ......................... 358/1.16 |
| 6,636,891 | B1 | * | 10/2003 | LeClair et al. .............. 709/208 |

OTHER PUBLICATIONS

"Lantech Ethernet Print Servers", available electronically at: http://www.net–shop.co.uk/technota/lps2a.htm, 1998, pp. 1–2.

"Axis Print Server for Windows", available electronically at: http://www.net–shop.co.uk/technota/nps150a.htm, p. 1.

"Axis MultiProtocol Ethernet Print Server", available electronically at: http://www.net–shop.co.uk/technota/nps50a.htm, 1998, pp. 1–4.

*IBM Book Manager® Book Server, "IPDS Reference", Sections 1.1,1.3,1.5,2.0–2.3,B.1,B.0 available electronically at*: http://ppdbooks.pok.ibm.com:80/cgi . . . mgr/book-mgr.cmd, 1987, 1996, 16 pages.

* cited by examiner

METHODS AND APPARATUS FOR REMOTE EXECUTION OF AN APPLICATION OVER THE INTERNET

This application is a continuation-in-part of co-pending prior application Ser. No. 09/187,193, filed on Nov. 6, 1998, which is hereby incorporated by reference.

BACKGROUND OF THE INVENTION

The invention of the present application relates generally to methods and apparatus for controlling execution of a remote application over the Internet and, in particular, receiving data from an input device over a computer network.

The introduction of networks, such as LANs, WANs, and the Internet, has revolutionized the field of computing and, in particular, inputting and outputting to other devices. Early computer workstations included a personal computer electrically connected to input and output devices, such as printers, scanners, fax machines, and cameras. Today, networks allow multiple computer workstations or personal computers (collectively called "clients") to share input or output devices.

To share resources across a network, the resources must be able to communicate using the same or compatible protocols. Conventional networks are organized as a series of layers, the numbers, names, contents, and function of which differ from network to network. In most conventional networks, however, each layer offers services to the higher layers while shielding those layers from the details of how the offered services are actually implemented. When machines communicate, the layers on each machine can communicate with an equivalent layer on other machines using the appropriate protocol for that layer. The protocols used by the layers of a system is referred to as a "protocol stack" and define the network environment. In an UNIX environment, for example, the Transmission Control Protocol/Internet Protocol (TCP/IP) protocol stack includes the transmission control protocol (TCP) and Internet protocol (IP). Server Message Block (SMB) is a protocol stack for passing information between network computers for processing by a device. The TCP/IP protocol stack is one of the most common protocols used on the Internet.

FIG. 1 shows a conventional printing system including multiple clients and a shared printing device. Clients 105, 110, and 115 are connected via network 118 to a shared server 120 and printer 135. Any of clients 105, 110, and 115 may use printer 135 via server 120. If client 105 wants to print, for example, it sends, or "pushes," a print job consisting of print commands and print data over network 118 to server 120. Server 120 stores the print job to a disk, queue, or "spool," 125 in server 120. As a print job percolates to the top of the print queue, print controller 130 reads the stored file from spool 125 and transmits the file to printer 135. Print controller 130 also sends commands to printer 135. In response, printer 135 processes the received file.

Conventional scanners also operate using "push" technology. Using a conventional scanner, for example, a document is scanned and an image file is created. The image file may be stored in memory on the scanner or sent to another remote device. The image file may be transmitted across a network using any conventional protocol or, for example, by attaching the image file to an electronic mail message. In conventional scanning devices, however, the image file is transmitted to, or "pushed," to any remote devices.

This conventional "push" technology has some limitations. In a conventional printing or scanning system, for example, clients transmit command information as well as a digital copy of the image file across the network to the destination. The receiving device must therefore have sufficient disk space to store the image files when they are received. In networks with many clients, a print server requires large amounts of costly disk space, and may delay accepting new jobs if the disk's spool has reached its maximum storage capacity. When the spool is full, the client may waste time querying the server and waiting for it to have sufficient space to receive the job. Furthermore, the client may be inoperable for other tasks until the server can process the job, which can be a significant period of time if the output file is very large. When a conventional scanner sends scanned image files to a destination without first communicating with the destination device, scanned image files may be lost or may exceed the file storage limit of the destination device.

Furthermore, network devices that receive data from or transmit data to clients on a variety of platforms require multiple protocols and are more difficult to implement and troubleshoot. A platform is any piece of hardware plus its software operating system. FIG. 2 illustrates a conventional scanner 210 that transmits scanned images to clients 230, 240, and 250, each operating on a different platform. Client 230 may be an Apple Macintosh using the MacOS® operating system, client 240 may be a PC using the UNIX operating system, and client 250 may be a PC operating the Windows 95® operating system. A scanner that transmits scan jobs to clients on different platforms requires multiple protocol stacks to interpret and output the print request. For example, as shown in FIG. 2, scanner 210 must contain TCP/IP 214, SMB 216, and PAP (Printer Access Protocol) 212 protocol stacks to communicate with the various clients 230, 240, and 250 on the network A scanner that must be configured to use a multitude of protocols is very complex, requiring additional time and resources to develop, troubleshoot, and maintain.

SUMMARY OF THE INVENTION

Consistent with this invention, in a network comprising an input device and a destination device, an input device receives input data and information identifying a destination address. The input device initiates transmission of the input data by notifying the destination device that data is ready for transmission. The input device receives a request from the destination device and transmits the input data to a location based on the request. A computer-readable medium consistent with the present invention contains instructions for outputting data in a network corresponding to tasks executable by a computer and performed by the input device.

Another method for remotely executing an application over a network consistent with this invention comprises the following operations, performed by the destination device. The destination device receives a notification from an input device. The destination device transmits to the input device a request to get the input data. The destination device retrieves data from the input device and stores the input data to a location based on the request. A computer-readable medium consistent with the present invention contains instructions for remotely executing an application over a network corresponding to tasks executable by a computer and performed by the input device.

A network scanner consistent with the present invention comprises an input mechanism for converting image data to a digital representation. The network scanner also comprises a controller for sending notifications to and receiving requests from a destination device. The destination device retrieves the data from the input device based on the request.

An apparatus for controlling data in a network consistent with the present invention comprises a memory having program instructions and a processor configured to receive input data and information identifying a destination address. The apparatus initiates transmission of the input data by notifying the destination device that data is ready for transmission, receives a request from the destination device, and transmits the input data to a location based on the request from the destination device.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Systems and methods consistent with the present invention operate in a network environment that has an input device acting as an initiator of a transaction and a destination device. In general, transmission of a data file is initiated by an input device, such as a scanner. The input device notifies a destination device that new data is ready to be received. If the destination device accepts the data, the destination device gets, or "pulls," the data from the input device.

One system and method consistent with the present invention uses the standard Web transfer protocol, HTTP. The HTTP protocol operates well over many different physical links and is a popular protocol for transferring various types of information between devices on a network. Implementation of the HTTP protocol reduces the need for the server to contain multiple protocol stacks for translating requests from initiators on different platforms. Reducing the number of protocol stacks in the server reduces complexity of the device thereby reducing development, testing, and troubleshooting time.

Reference will now be made in detail to implementations consistent with the principles of the present invention as illustrated in the accompanying drawings. Wherever possible, the same reference numbers will be used throughout the drawings and the following description to refer to the same or like parts.

A. Architecture

Systems and methods consistent with the present invention may be implemented using a variety of architectures that will be described in more detail below. In general, the systems will comprise an input device, such as a scanner, and a destination device, such as a client, connected via a network. As will be described below, the input device may be a "thin" device attached to the network, server, or client. A "thin" device is one that contains an input mechanism, such as a scan converter, but performs most operations and stores most data on a remote location.

Figure 1:
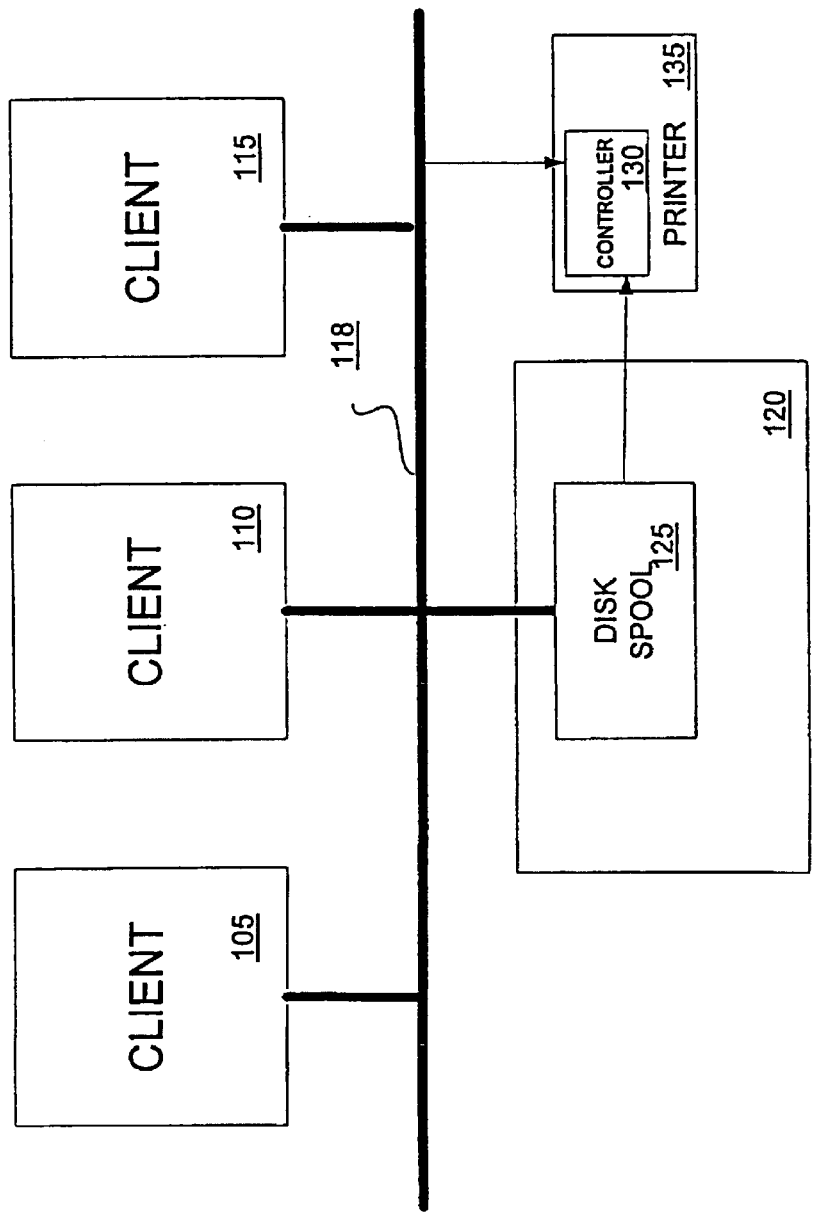
FIG. 1 is an illustration of a conventional network comprising clients, a printer, and a print server.
Figure 2:
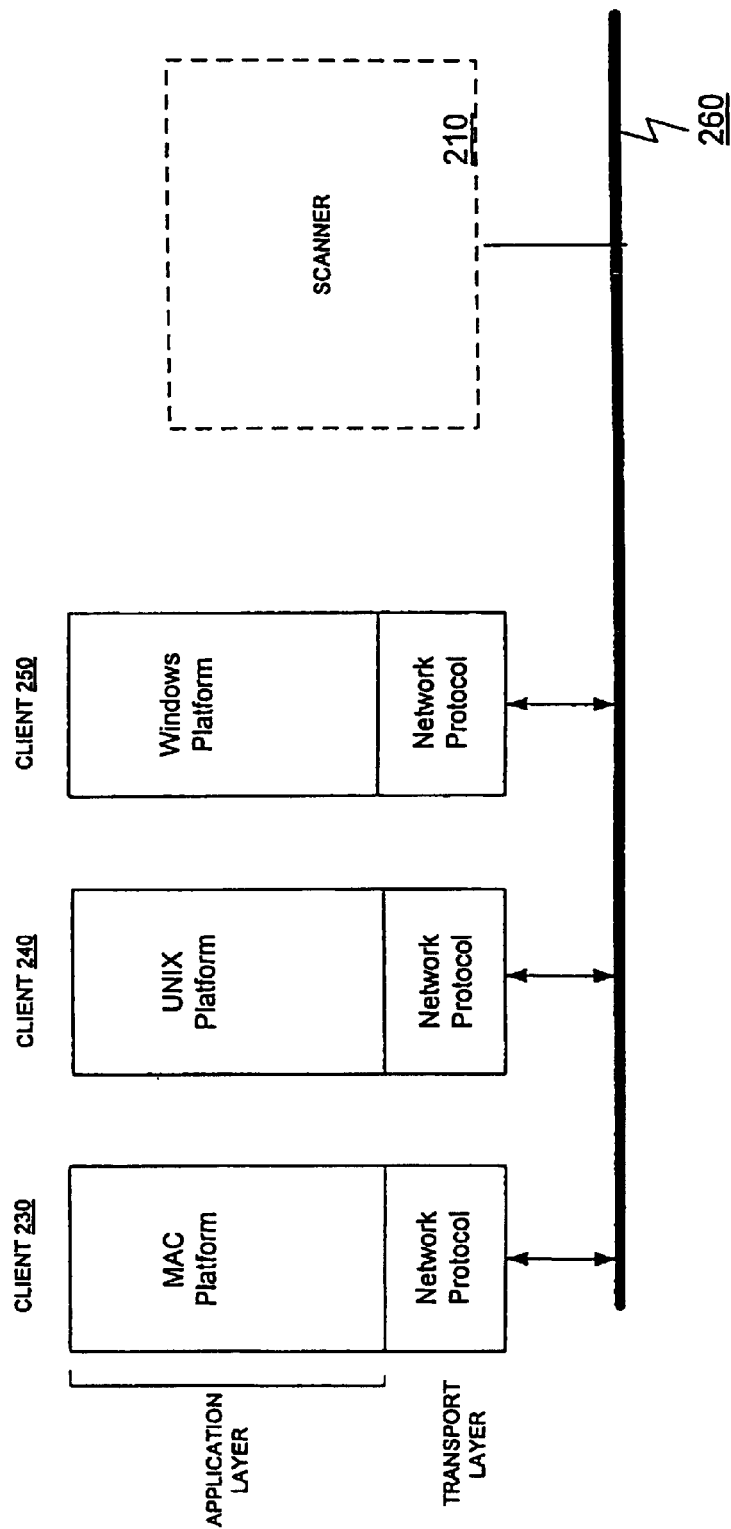
FIG. 2 illustrates a conventional network scanner.
Figure 3:
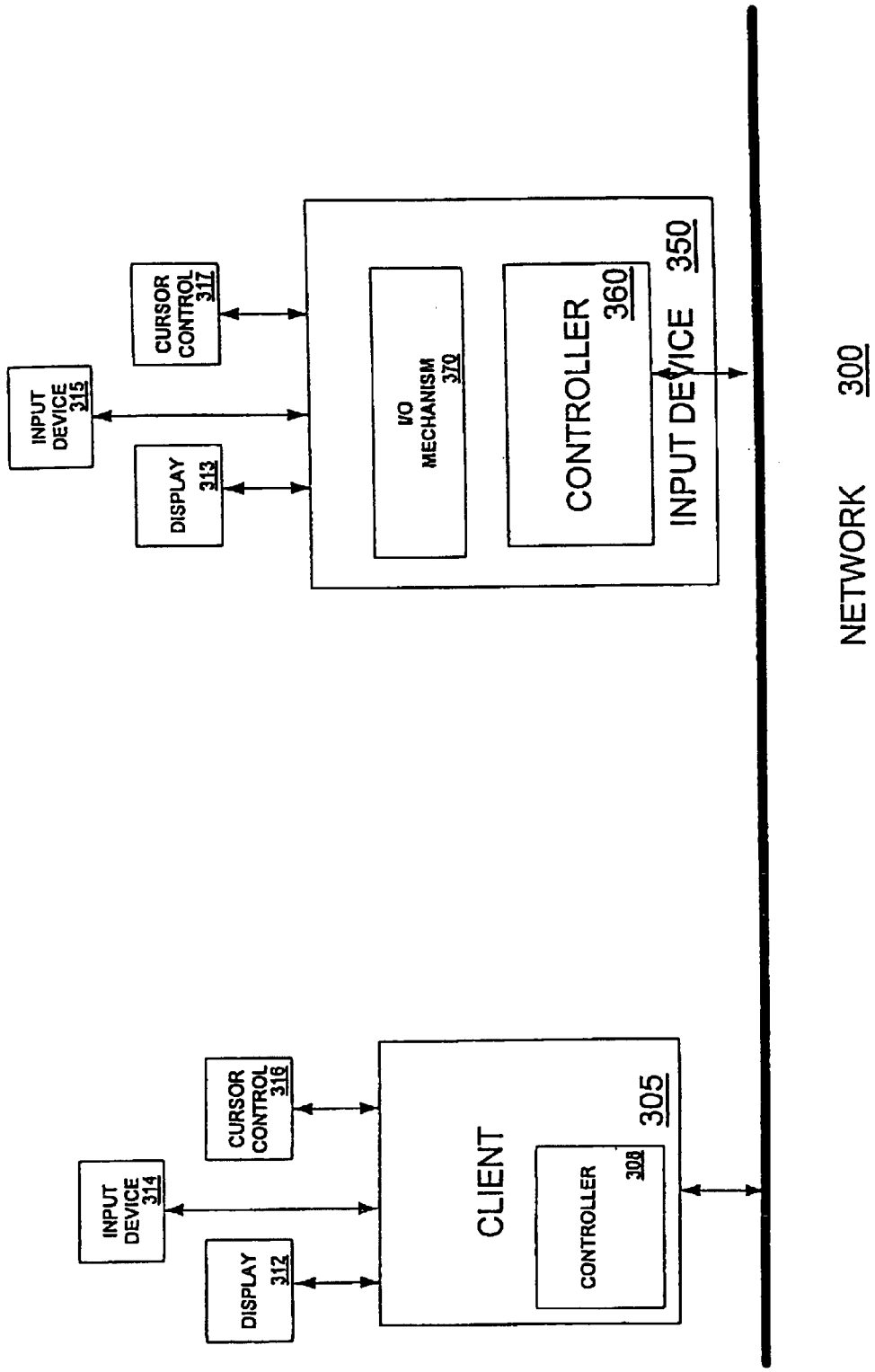
FIG. 3 shows a system consistent with the present invention.

FIG. 3 is a block diagram that illustrates one system consistent with the present invention. As shown in FIG. 3, the system comprises a client 305 and an input device 350 capable of communicating with one another through network 300. Network 300 may be a LAN, WAN, or Internet comprising multiple LANs and WANs. Network 300 uses electric, electromagnetic, radio frequency, and optical signals to carry digital data streams. The signals that carry digital data through network 300 to and from client 305 and input device 350 are exemplary forms of carrier waves.

Client 305 and input device 350 can send messages and receive data, including program code, through the network 300. For example, client 305 might transmit a request to download program code from input device 350, or input device 350 may transmit a request to download program code from client 305 or another network resource through network 300. One such downloaded application may be an input driver program, as described herein. In this manner, client 305 may obtain application code in the form of a carrier wave. For example, the application code may be encoded and transmitted as packets on a carrier wave.

Figure 4:
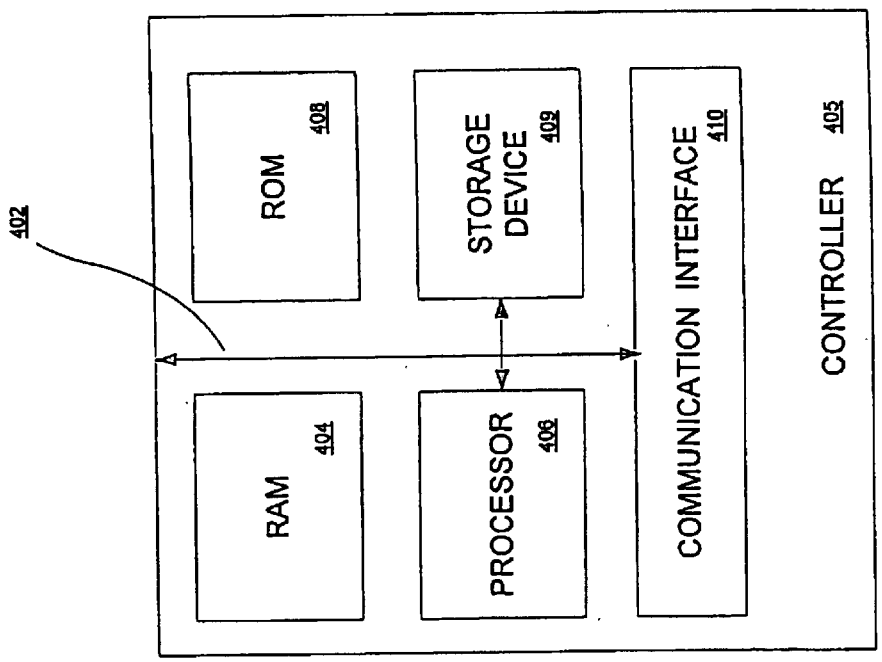
FIG. 4 shows a controller consistent with the present invention.

In FIG. 3, client 305 and input device 350 contain controllers 308 and 360, respectively, similar to controller 405 as shown in FIG. 4. Controller 405 contains a processor 406, RAM 404, ROM 408, storage device 409, and communication interface 410 capable of communicating via bus 402. Processor 406 is a conventional microprocessor unit. RAM 404 can be a static or dynamic storage device, and stores information, temporary variables, and instructions to be executed by processor 406. ROM 408, which can be any type of nonvolatile static storage device appropriate to the task, stores static information and instructions for processor 406. A storage device 409, such as a magnetic disk or optical disk, is provided and coupled to bus 402 for storing information and instructions.

Controller 405 also includes a communication interface 410 coupled to bus 402. Communication interface 410 provides a two-way data communication coupling to a network. For example, communication interface 410 may be an ISDN card, cable modem, or a modem to provide a data communication connection to a corresponding type of telephone line. As another example, communication interface 410 may be a LAN card that provides a data communication connection to a compatible LAN. Wireless links may also be implemented. In any such implementation, communication interface 410 sends and receives electrical, electromagnetic or optical signals that carry digital data streams representing various types of information.

Consistent with one implementation of the invention, processor 406 executes one or more sequences of instructions in ROM 408. Executing the sequences of instructions in memory ROM 408 causes processor 406 to perform the method for controlling access to an input device described below. Alternatively, hard-wired circuitry may be used in place of or in combination with software instructions. Systems and methods consistent with the present invention are not limited to any specific combination of hardware circuitry and software.

The term "computer-readable medium" as used herein refers to any media that participates in providing instructions to processor 406 for execution. Such a medium may take many forms, including but not limited to, non-volatile media, volatile media, and transmission media. Non-volatile media includes, for example, optical or magnetic disks, such as ROM 408. Volatile media includes dynamic memory, such as RAM 404. Transmission media includes coaxial cables, copper wire, and fiber optics, including bus 402. Transmission media can also take the form of acoustic or light waves, such as those generated during radio-wave and infra-red data communications. Common forms of computer-readable media include a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described above, or any other medium from which a computer can read data.

Various forms of computer readable media may be involved in carrying the instructions to processor 406 for execution. For example, the instructions may initially be carried on magnetic disk of a remote computer. The remote computer can load the instructions into its dynamic memory and send the instructions over a telephone line using a modem. A modem local to controller 405 can receive the data on the telephone line and use an infrared transmitter to convert the data to an infrared signal. An infrared detector coupled to bus 402 can receive the data carried in that signal and place the data on bus 402. Bus 402 carries the data to ROM 408, from which processor 406 retrieves and executes the instructions. The instructions received by processor 406 may also be stored on storage device 409 either before or after execution by processor 406.

Referring again to FIG. 3, client 305 may be a conventional PC containing controller 308. In addition, client 305 and input device 350 may contain attached peripherals, such as displays, user input devices, and devices for cursor control. In FIG. 3, client 305 is shown coupled via standard bus to display 312, input device 314, and cursor control 316. Input device 350 is shown coupled via standard bus to display 313, input device 315, and cursor control 317. Displays 312 and 313 may be any conventional display device used for displaying information to a user, such as a CRT, LCD, LED, or custom display device. In addition, user input devices 314 and 315 are devices, such as a keyboard, that includes alphanumeric and other keys for communicating information and command selections to client 305. Another type of user input device is cursor control 316 and 317, such as a mouse, a trackball or cursor direction keys for communicating direction information and command selections to client 305 and for controlling cursor movement on displays 312 or 313.

Input device 350 may be an input device, such as a scanner, camera, or fax machine. As shown in FIG. 3, input device 350 can include a controller 360 and an input mechanism 370. Controller 360 may be similar to controller 405 in FIG. 4, or may contain a smaller RAM, ROM, or storage device, or a processor with different capabilities. Input mechanism 370 receives data such as, for example, by scanning or recording a document or receiving an image. If input device 350 is a scanner, for example, input mechanism 370 may be a scan converter that converts printed information to digital data such as, for example, an Epson Scanner model ES-8000C. If input device 350 is a camera, for example, input mechanism 370 may be an Epson Photo PC 700.

Figure 5:
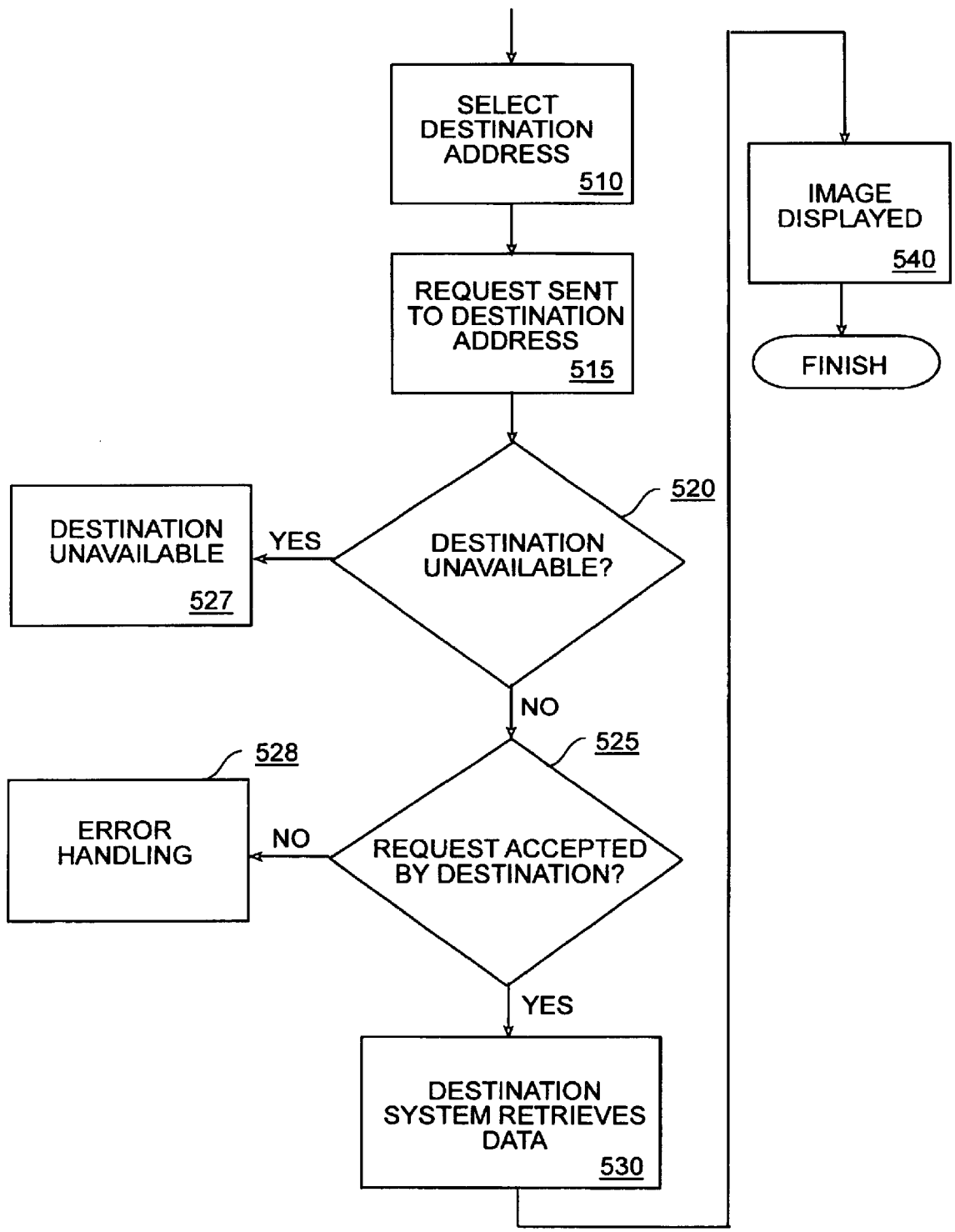
FIG. 5 is a flow diagram of operations performed to execute remotely an application over a network consistent with the present invention.
Figure 6:
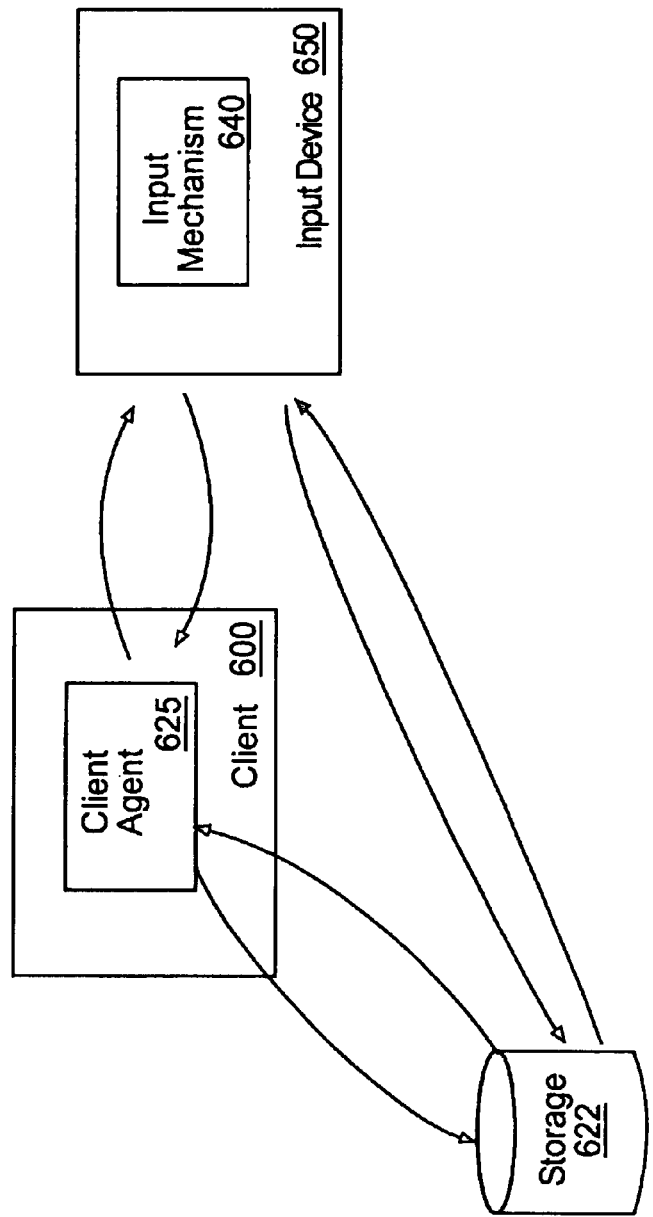
FIG. 6 is a data flow diagram consistent with the present invention.
Figure 7:
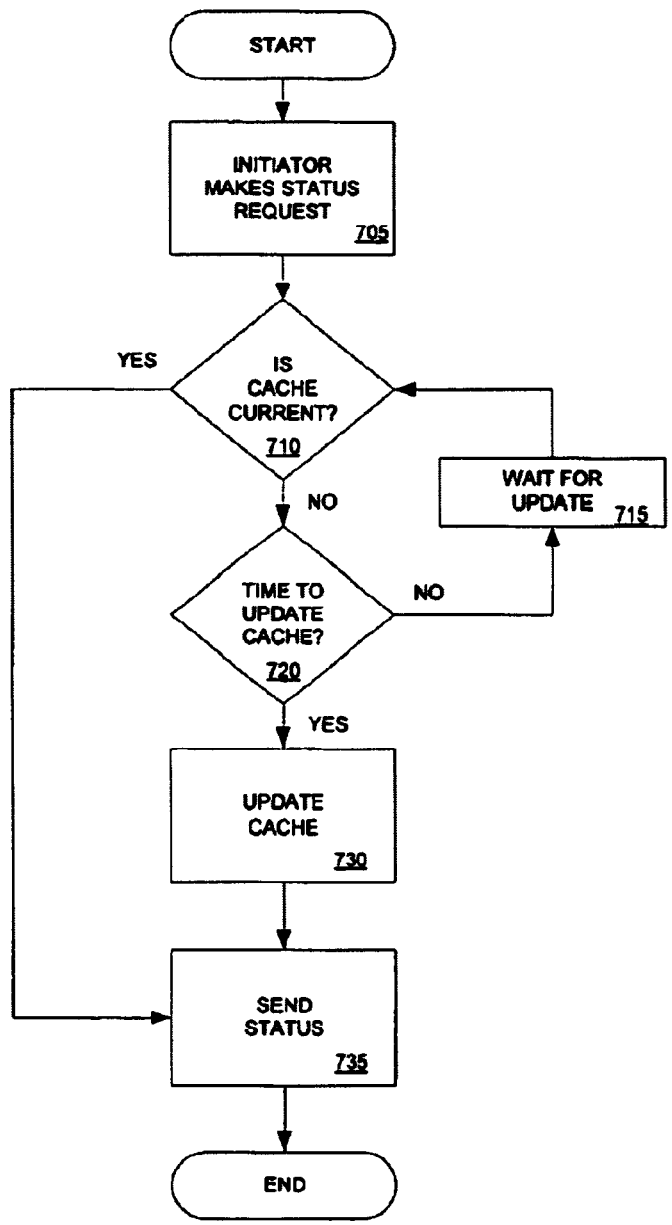
FIG. 7 is a flow diagram of operations performed to obtain status information consistent with the present invention.

The input systems described above may be used to implement methods of executing an application across a network consistent with the present invention. FIG. 5 illustrates steps of a method consistent with the present invention. FIG. 6 shows a data flow diagram illustrating the flow of data consistent with the method of FIG. 5. The steps of the method of FIG. 5 are described in more detail below with reference to the system depicted in FIG. 3 and the data flow diagram of FIG. 6. FIG. 7 illustrates one embodiment of the method of FIG. 5 in which the input device is a scanner.

B. Inputting Data from an Input Device

The systems described above may be used to control an input device that receives or generates data. FIG. 5 illustrates a method of executing remotely an application to control an input device, such as a scanner, camera, or fax. The steps of the method are illustrated with reference to the systems depicted in FIG. 3 and the data flow diagram of FIG. 6.

Consistent with the present invention, the method begins with the initiation of transmission at an input device 650. Initiation may occur, for example, by putting a document on a scanner, turning on a camera, or receiving a signal indicating an incoming fax. Receipt of input data therefore generally begins with the input device 650 of FIG. 6. Input device 650 will convert the received images to digital data and may also store the data to a location in input device 650, or another accessible storage location, such as storage 622. That is, the input device initiates transmission of the input data by notifying the destination, or client, device that data is ready for transmission, receives a request from the destination device, and transmits the input data to a location based on the request from the destination device. Input device 650 may also accept a list of addresses to which the device would like to transfer the input data (step 510). For example, input device 650 may be a fax machine that accepts a document, converts it to digital data, and allows the user to input various network addresses that would like to receive the faxed information.

Input device 650 notifies the server that input device 650 has data to transmit by, for example, sending an HTTP request to one or more of the destination addresses, such as client 600 (step 515). If there is no response from the destination device, the destination may be turned off or otherwise unavailable to receive the input data (step 520). The process may revert to error handling or terminate. If the destination device is turned on, but not functioning, i.e. the request is not accepted by its destination, (step 525), the destination device may return a message that it is unavailable (step 528). If the destination device is turned off (step 520), the request may be returned to input device 650 signaling that the destination device is unavailable (step 527).

In the example shown in FIG. 6, client 600 is a destination device. If client 600 is available, client 600 receives the HTTP request. The request contains such information as image characteristics, file size, and other information about the data. Other information may include, for example, image resolution, image size, and image format (e.g. .jpg, .gif, or compressed). Input device 650 and client 600 may exchange a series of queries for information about the data and the capability of the destination device.

If the HTTP request is rejected by the destination device (step 525), the process may revert to error handling (step 528). The request may be rejected if, for example, input device 650 wants to send data in a resolution, size, or format that client 600 cannot handle.

If the request is accepted by the destination device (step 525), the destination system may get the data from the input device by, for example, initiating an image viewer or using an HTTP "GET" command (step 530). If client 600 is capable of handling the request, but not immediately processing the request, client 600 may wait for some period of time before responding to the request. When client 600 is ready to get the data from input device 650, client agent 625 sends a GET command. In response, input device 650 sends another request to client 600. The request may contain, for example, a URL of the location of the data to be retrieved or the network address of input device 650. Client agent 625 of client 600 responds to the request by initiating an HTTP GET command using the information contained in the request. The GET request may also include information about the requirements such as the input device, input format type, and other special requirements. Alternatively, a user may invoke a browser or custom HTTP client to submit the same information, as in the GET command, or initiate an image viewer that retrieves the data during execution.

The amount of data that the destination device receives with any one request may depend on the capabilities of the input device for which the job is destined. If, for example, the input device is a serial device, a GET request may obtain only a small block of data. If the input device is a page-oriented device, such as a scanner, the GET request may bring back data one page at a time. Additionally, there are instances where the GET request may copy and bring back the entire input file. If the input device needs to input multiple copies of a large file, for example, the input process may be quicker if the destination client retrieves a copy of the entire input file rather than make multiple requests one page at a time.

Client 600 receives the data and displayed the image (step 540). If the data needs to be converted, client 600 may convert the data to an appropriate format.

C. Querying for Status

Using an HTTP protocol for communications between an input device and a destination device, a client may query an input device for status of the request or an input device may query the destination device for status of the transmission. FIG. 7 illustrates the steps of an initiator requesting status and a recipient receiving status reports.

To obtain status, an initiator (client 600 or input device 650) makes a status request (step 705) including, for example, job identifier, information contained in the request, or information identifying the location of the destination or input devices. In an HTTP environment, the status request may be made in the form of a GET request to a remote device. The GET request may also be followed by header information that asks the input device to send only that data that has been modified since the last status request.

Consistent with the present invention, status information may be stored in a status information cache on the input device, the client, or on the network. Frequently contacting an input device for status may interrupt or slow data transfer, particularly if status is checked very frequently. Use of a status cache can control interruptions to input devices and improve performance. The cache is updated during idle states or when there is an error at the input device that prevents data transfer. Another advantage of caching status information is that a system administrator can define the rules for updating the status cache and the frequency of status queries to the input device.

Before providing the initiator with status, the recipient may check to see if the status cache contains current status information (step 710). The recipient may, for example, compare the time on the request to see if the cache has been updated since the last status request. If the cache is current, the recipient may send the status information from the cache (step 735).

If the status information is not current, the recipient determines whether it is an appropriate time to update the status cache. If not, the recipient may wait for an update (step 715) or send the information that is in the cache (step 730). If, however, the recipient has not queried the initiator in a long time, or if the recipient detects that the initiator is inactive, the recipient may update the cache by querying the initiator for status (step 730).

The recipient then formats a reply containing the status of the recipient device and transmits the information to the initiator (step 735).

D. Conclusion

As described in detail above, methods and apparatus consistent with the present invention operate in a network environment having a destination device and an input device. In general, transmission of a data file is initiated by an input device, such as a scanner. The input device notifies a destination device that new data is ready to be received. If the destination device wants to accept the data, the destination device gets, or "pulls," the data from the input device. The foregoing description of an implementation of the invention has been presented for purposes of illustration and description. Modifications and variations are possible in light of the above teachings or may be acquired from practicing the invention.

Although systems and methods consistent with the present invention are described as operating in the exemplary distributed system, one skilled in the art will appreciate that the present invention can be practiced in other systems and programming environments. The scope of the invention is therefore defined by the claims and their equivalents.

What is claimed is:

1. A method for remote execution of an application over a network including a destination device and an input device, wherein said destination device is external and separate from said input device, the method comprising the operations of:

having said input device receive input data;

having said input device initiate transmission of said input data by notifying said destination device that data is ready for transmission;

having said input device receive a request specifying a preferred file format and convert said received input data to said preferred file format;

having said destination device send information to said input device identifying an address for a remote storage device accessible over said network and remote from said input device and said destination device;

having said input device respond to said receiving of said input data by sending the received input data to said remote storage device in accordance with said address, and sending a notification to said destination device indicating that input data is ready for pickup at said remote storage device; and having said destination device initiate a retrieval of said input data in response to said notification.

2. The method of claim 1, further comprising:

having said input device transmit status information in response to a status request.

3. A computer-readable medium containing instruction for remote execution of an application in a network having an input device, a destination device, and a remote storage device remote from said input device and said destination device, wherein said destination device is external and separate from said input device, the instructions corresponding to computer tasks comprising:

having said input device receive input data;

having said input device initiate transmission of said input data by notifying said destination device that data is ready for transmission;

having said input device receive a request specifying a preferred file format and convert said received input data to said preferred file format;

having said destination device send information to said input device identifying an address for said remote storage device;

having said input device respond to said receiving of said input data by sending the received input data to said remote storage device in accordance said address, and sending a notification to said destination device indicating that input data is ready for pickup at said remote storage device; and having said destination device initiate a retrieval of said input data in response to said notification.

4. The computer readable medium of claim 3, further comprising:

having said input device transmit status information in response to a status request.

5. A network data control system comprising:

an input device for receiving input data, said input device having access to a network;

a destination device remote from said input device and having access to said network;

a remote storage device accessible via said network and remote from said input device and said destination device; wherein said input device initiate transmission of said input data by notifying said destination device that data is ready for transmission;

said input device receive a request specifying a preferred file format and convert said received input data to said preferred file format;

said destination device is effective for transmitting to said input device information identifying an address for said remote storage device;

said input device is effective for transferring the input data to said remote storage device in accordance with said address and transmitting a notification to said destination device including instructions for accessing the input data from said remote storage device; and said destination device responds to said notification by retrieving the input data form one of said input device and said remote storage device.

6. The network data control system of claim 5, wherein said input device is a network scanner.

7. A network image data transfer system comprising:

an image input device for generating image data, said image input device having access to a network;

a client device having access to said network, said client device being external and separate from said image input device;

a remote storage device accessible via said network and remote from said image input device and said client device; wherein said image input device initiates transmission of said image data by notifying said client device that data is ready for transmission;

said image input device receives a request specifying a preferred file format and converts said received image data to said preferred file format;

said client device is effective for transmitting to said image input device information identifying an address for said remote storage device;

said image input device transfers said image data to said remote storage device in accordance with said address and transmits a notification to said client device including instructions for accessing said image data from said remote storage device; and said client device responds to said notification by retrieving said image data over said network from said remote storage device.

8. The network image data transfer system of claim 7, wherein said notification includes information for locating said image data within the file structure of said remote storage device.

9. The network image data transfer system of claim 7, wherein said instructions include a Uniform Resource Locator, URL, for accessing said image data from said remote storage device.

10. The network image data transfer system of claim 9, wherein said network is the Internet.

11. The network image data transfer system of claim 10, wherein said image input device stores said image data and makes it accessible through HTTP communication protocols, and provides information for accessing said storaged image data within said notification.

12. The network image data transfer system of claim 10, wherein said image input device is further effective for receiving the network addresses of a plurality of said client devices, and transmits said notification to a select group of client devices within said plurality of client devices.

13. The network image data transfer system of claim 12, wherein the client devices within said select group each independently initiates the retrieval of said image data using the HTTP GET protocol.

14. The network image data transfer system of claim 7, wherein said client device submits the network address of said remote storage device to said image input device, and said image input device accesses said remote storage device using submitted network address.

15. The network image data transfer system of claim 7, wherein said notification includes parameter data descriptive of said image data, and said client device initiates the retrieval of said image data only if it determines that its physical parameters are capable of manipulating said image data.

16. The network image data transfer system of claim 15, wherein said parameter data includes at least the resolution of said image data, and the decision whether to retrieve said image data is dependent on the specified resolution of said image data and whether said client device can handle the specified resolution.

17. The network image data transfer system of claim 15, wherein prior to retrieving said image data, said client device submits a preferred file format to said image input device, and retrieves said image data only if said image data is in said preferred file format.

18. The network image data transfer system of claim 17, wherein said image input device responds to said submission of said preferred file format from said client device by converting said image data into said preferred file format if said image data is not already in said preferred file format.

19. The network image data transfer system of claim 17, wherein said preferred file format is one of a GIF format, JPEG format, or other file compression format.

20. The network image data transfer system of claim 17, wherein said image input device is further effective for receiving the network address of said client device, and transmits said notification to said client device according to said received network address.

21. The network image data transfer system of claim 7, wherein said input device is one of a scanner, camera, and facsimile machine.

22. A method for transferring image data in a network comprising:

providing an image input device for generating image data, and providing said image input device having access to a network;

providing a client device external and separate from said image input device and having access to said network;

providing a remote storage device accessible via said network and remote from said image input device and said client device; wherein said image input device initiates transmission of said image data by notifying said client device that data is ready for transmission;

said image input device receives a request specifying a preferred file format and converts said received image data to said preferred file format;

said client device is effective for transmitting to said image input device information identifying an address for said remote storage device;

having said image input device transfer said image data to said remote storage device in accordance with said address and transmit a notification to said client device including instructions for accessing said image data from said remote storage device; and having said client device respond to said notification by retrieving said image data over said network from said remote storage device.

23. The method of claim 22, wherein said notification further includes information for locating said image data within the file structure of said remote storage device.

24. The method of claim 22, wherein said instructions include a Uniform Resource Locator, URL, for accessing said image data from said remote storage device includes.

25. The method of claim 24, wherein said network is selected to be the Internet.

26. The method claim 25, wherein said image input device further implements the steps of storing said image data and making it accessible through HTTP communication protocols, and providing information for accessing said stored image data within said notification.

27. The method of claim 25, wherein said image input device further implements the steps of receiving the network addresses of a plurality of said client devices, and transmitting said notification to a select group of client devices within said plurality of client devices.

28. The method of claim 27, wherein the client devices within said select group each independently initiate the retrieval of said image data using the HTTP GET protocol.

29. The method of claim 22, wherein said client device initiates the retrieval of said image data using the HTTP GET protocol.

30. The method of claim 29, wherein said notification includes parameter data descriptive of said image data, and said client device initiates the retrieval of said image data only if it determines that its physical parameters are capable of manipulating said image data.

31. The method of claim 30, wherein said parameter data includes at least the resolution of said image data, and the decision whether to retrieve said image data is dependent on the specified resolution of said image data and on whether said client device can handle the specified resolution.

32. The method of claim 30, wherein prior to retrieving said image data, said client device submits a preferred file format to said image input device, and retrieves said image data only if said image data is in said preferred file format.

33. The method of claim 32, wherein said image input device responds to said submission of said preferred file format from said client device by converting said image data into said preferred file format if said image data is not already in said preferred file format.

34. The method of claim 32, wherein said preferred file format is one of a GIF format, JPEG format, and other file compression format.

35. The method claim 22, wherein said image input device further implements the steps of receiving the network address of said remote storage device from said client device, and accessing said remote storage device according to said received network address.

36. A computer-readable medium containing instructions for implementing the method of claim 22 and transferring image data in said network having said image input device, client device and remote storage device.

* * * * *

UNITED STATES PATENT AND TRADEMARK OFFICE
CERTIFICATE OF CORRECTION

PATENT NO. : 6,988,123 B2  Page 1 of 1
APPLICATION NO. : 09/329182
DATED : January 17, 2006
INVENTOR(S) : Gregory Leclair et al.

It is certified that error appears in the above-identified patent and that said Letters Patent is hereby corrected as shown below:

Column 10,

Line 66, please change "of claim 17," to --of claim 7,--

Signed and Sealed this

Tenth Day of June, 2008

JON W. DUDAS
*Director of the United States Patent and Trademark Office*